US010605598B2

(12) United States Patent
Asay

(10) Patent No.: US 10,605,598 B2
(45) Date of Patent: Mar. 31, 2020

(54) CLAMPING INDICATOR TOOL

(71) Applicant: Steve R. Asay, Denver, CO (US)

(72) Inventor: Steve R. Asay, Denver, CO (US)

(*) Notice: Subject to any disclaimer, the term of this patent is extended or adjusted under 35 U.S.C. 154(b) by 0 days.

(21) Appl. No.: 14/704,965

(22) Filed: May 5, 2015

(65) Prior Publication Data
US 2016/0327388 A1 Nov. 10, 2016

(51) Int. Cl.
G01C 9/02 (2006.01)
H02G 3/00 (2006.01)

(52) U.S. Cl.
CPC .............. G01C 9/02 (2013.01); H02G 3/00 (2013.01); H02G 2200/30 (2013.01)

(58) Field of Classification Search
CPC .............. G01C 9/02; G01C 9/26; G01C 9/28
USPC ............................ 33/347, 370, 371, 372, 373
See application file for complete search history.

(56) References Cited

U.S. PATENT DOCUMENTS

| 5,819,425 A * | 10/1998 | Payne | F16B 2/06 248/229.13 |
| 6,029,359 A * | 2/2000 | Szumer | G01C 9/28 33/373 |
| 6,389,709 B1 * | 5/2002 | Lunde | G01O 5/00 33/292 |
| 8,402,667 B2 * | 3/2013 | Spaulding | G01C 9/26 33/370 |
| 8,701,305 B1 * | 4/2014 | Schoenebeck | G01C 9/28 33/347 |
| 9,207,075 B2 * | 12/2015 | Lettkeman | G01C 9/28 |
| 2006/0053563 A1 * | 3/2006 | Skinner | B25B 7/10 7/127 |
| 2011/0146091 A1 * | 6/2011 | Spaulding | G01C 9/26 33/372 |
| 2014/0075769 A1 * | 3/2014 | Swisher | B44D 2/007 33/301 |
| 2016/0025490 A1 * | 1/2016 | Hoppe | G01C 9/26 33/381 |
| 2016/0146603 A1 * | 5/2016 | Lamont | G01C 9/34 33/381 |

* cited by examiner

Primary Examiner — G. Bradley Bennett

(57) ABSTRACT

A clamping indicator tool utilizes a clamping mechanism having a set of clamping arms and optionally a number of clamping paws. The clamping arms and paws can grasp and hold onto a wide variety of items to ensure that the clamping mechanism is secured to the item. The clamping arms are actuated by a set of clamp handles that are spring loaded so as to automatically close the clamping arms and clamping paws around an item when the user releases the clamp handles. In one embodiment, a tool plate fits over the clamp handles and removably engages with the clamp. Mounted onto the tool plate is a level indicator and a plumb indicator. In an alternate embodiment a slope plate mounts on the clamp in place of the tool plate. In this embodiment, a slope indicator is present on the slope plate and allows the tool to indicate slope.

4 Claims, 19 Drawing Sheets

CLAMPING INDICATOR TOOL

TECHNICAL FIELD

The present invention relates generally to the field of tools; and, more particularly, to a clamping indicator tool.

BACKGROUND

When constructing buildings, installing wiring, running piping, or performing many other similar construction-related tasks, it is often essential to employ a level/plumb tool in order to set an item level or plumb. Similarly, sometimes an item must be set at a certain angle (as opposed to level/plumb), and it is necessary to employ a slope-indicator tool to ensure that the item is set at the appropriate angle. In any of the above cases, construction personnel can employ a number of different prior-art tools, all of which suffer from one or more inadequacies. For example, although a standard carpenter's bubble level can help one determine whether an item is level or plumb, it is woefully inadequate when one needs to use both hands for another task while still taking a level/plumb reading. Similarly, the bubble level does not do a good job of indicating slope, nor does it allow one to set items at a certain slope accurately and repeatably.

What is needed is a clamping indicator tool that can clamp on to a myriad of different items to be measured so that the user can employ the device in a hands-free manner. Furthermore, a clamping indicator tool should be multi-purpose so that the single tool can be used to measure level, plumb, and even slope. It should be compact, light, transportable and able to be kept in easy reach while working a job.

SUMMARY

One embodiment of a clamping indicator tool utilizes a set of clamping arms with a plurality of clamping paws at their distal ends. The clamping paws can grasp and hold onto a wide variety of items to ensure that the clamping arms are secured to the item. The clamping arms are actuated by a set of clamp handles that are spring loaded so as to automatically close the clamping arms and clamping paws around an item when the user releases the clamp handles. In one embodiment, a tool plate fits over the clamp handles and removably engages with the clamp. Mounted onto the tool plate is a level indicator and a plumb indicator. In an alternate embodiment a slope plate mounts on the clamp in place of the tool plate. In this embodiment, a slope indicator is present on the slope plate and allows the tool to measure and indicate the slope.

DETAILED DESCRIPTION

Figure 1:
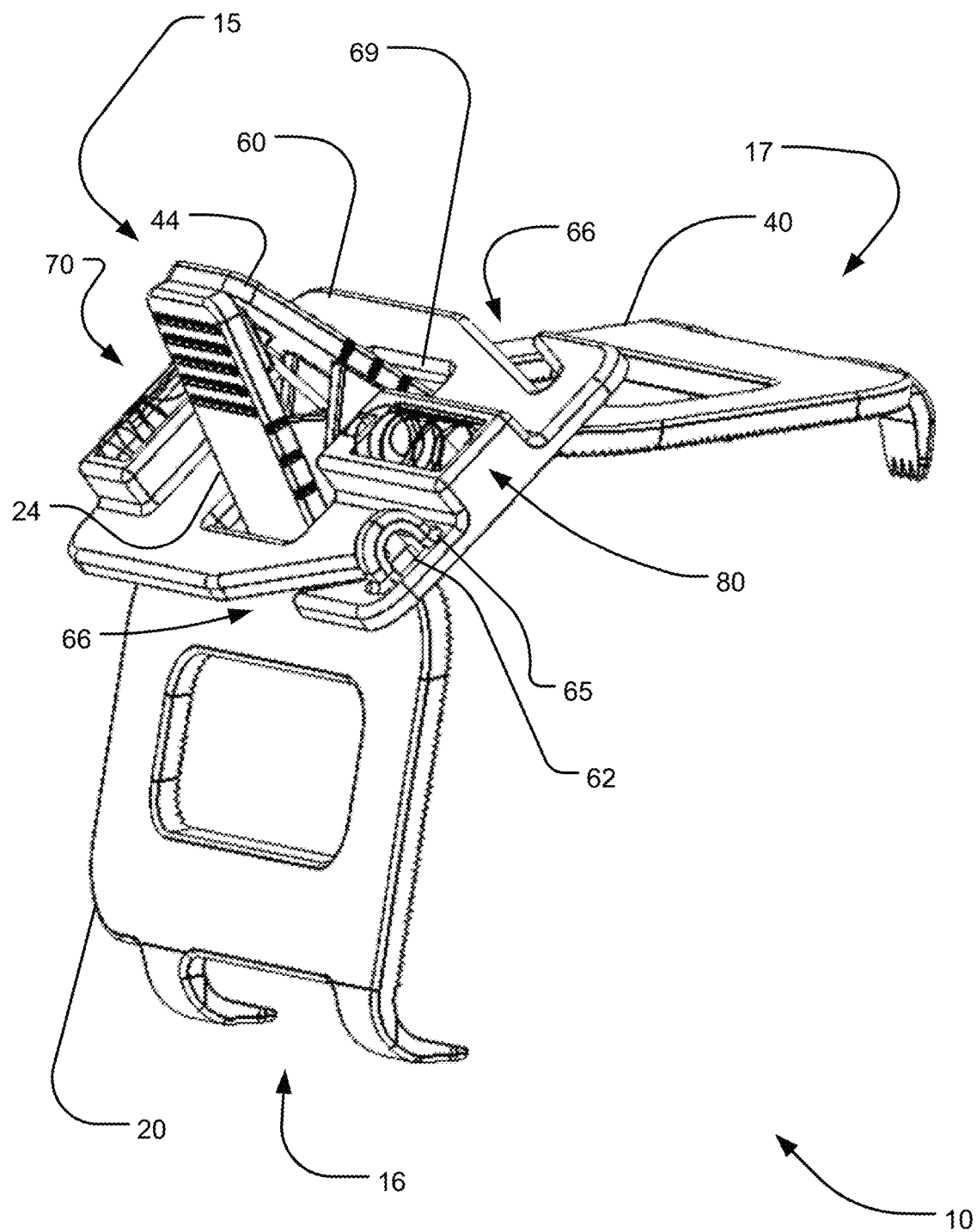
FIG. 1 illustrates a top and front perspective view of an exemplary embodiment of a clamping indicator tool.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below in the accompanying Figures. The following detailed description provides a comprehensive review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Referring now to the drawings, FIG. 1 illustrates a top and front perspective view of an exemplary embodiment of a clamping indicator tool 10. The tool 10 utilizes a clamping mechanism 15 and a tool plate 60. The clamping mechanism 15 comprises two clamps, each having a grasp handle, a clamping arm 20 and 40, and a plurality of clamping paws at the distal end thereof. The tool plate 60 has a clamping handle port 69 therein that allows the tool plate 60 to fit down over the grasp handles and engage the clamping mechanism 15. The tool plate 60 can encompass a number of unique and novel features, such as a level indicator 80, a plumb indicator 70, a plurality of hangers 66, a tie loop 65, a tie port 62, etc.

The clamping mechanism 15 comprises a first clamp 16 and a second clamp 17. The first clamp 16 has a first grasp handle 24 attached to a first clamping arm 20. The first clamping arm 20 can have a plurality of clamping paws at its distal end to help the clamping mechanism 15 hold onto whatever item is being clamped. Similarly, the second clamp 17 has a second grasp handle 44 attached to a second clamping arm 40. The second clamping arm 40 can have a plurality of clamping paws at its distal end. The clamping arms 20 and 40 extend downwards from the tool plate 60 when in an unclamped configuration. When ready to clamp, the user simply squeezes the grasp handles 24 and 44 together, causing the clamping arms 20 and 40 to separate. The user then places the item to be clamped within the clamping arms 20 and 40 (or between the pluralities of clamping paws) and releases the grasp handles 24 and 44. A spring or other tensioning means between the first clamp 16 and second clamp 17 then causes the clamping arms to close and grasp the item therebetween (or between the pluralities of clamping paws).

The tool plate 60 comprises a generally flat, elongated member that holds a number of indicator devices such as a spirit bubble level (or other type of level), a bubble plumb indicator (or other type of plumb indicator). Additionally, in another embodiment, a slope indicator can be included (see FIGS. 17-19). The tool plate has a clamping handle port 69 therein that allows the tool plate 60 to fit down over the grasp handles 24 and 44 and engage the clamping mechanism 15. The grasp handles 24 and 44 can have alignment indicia thereon (see plurality of alignment indicia 25 and 45 in FIG. 5).

The tool plate 60 can have a plurality of hangers 66 that allow the tool to be hung on a line, nail, screw, from a pocket, etc. Further, the tool plate 60 can have a tie loop 65 which allows the tool 10 to accept a cord, cable, or other means of suspending the tool therefrom. The tool plate 60 can also (or alternatively) include a tie port 62 that can also accept a cord, cable, or other means of suspending the tool therefrom.

Figure 2:
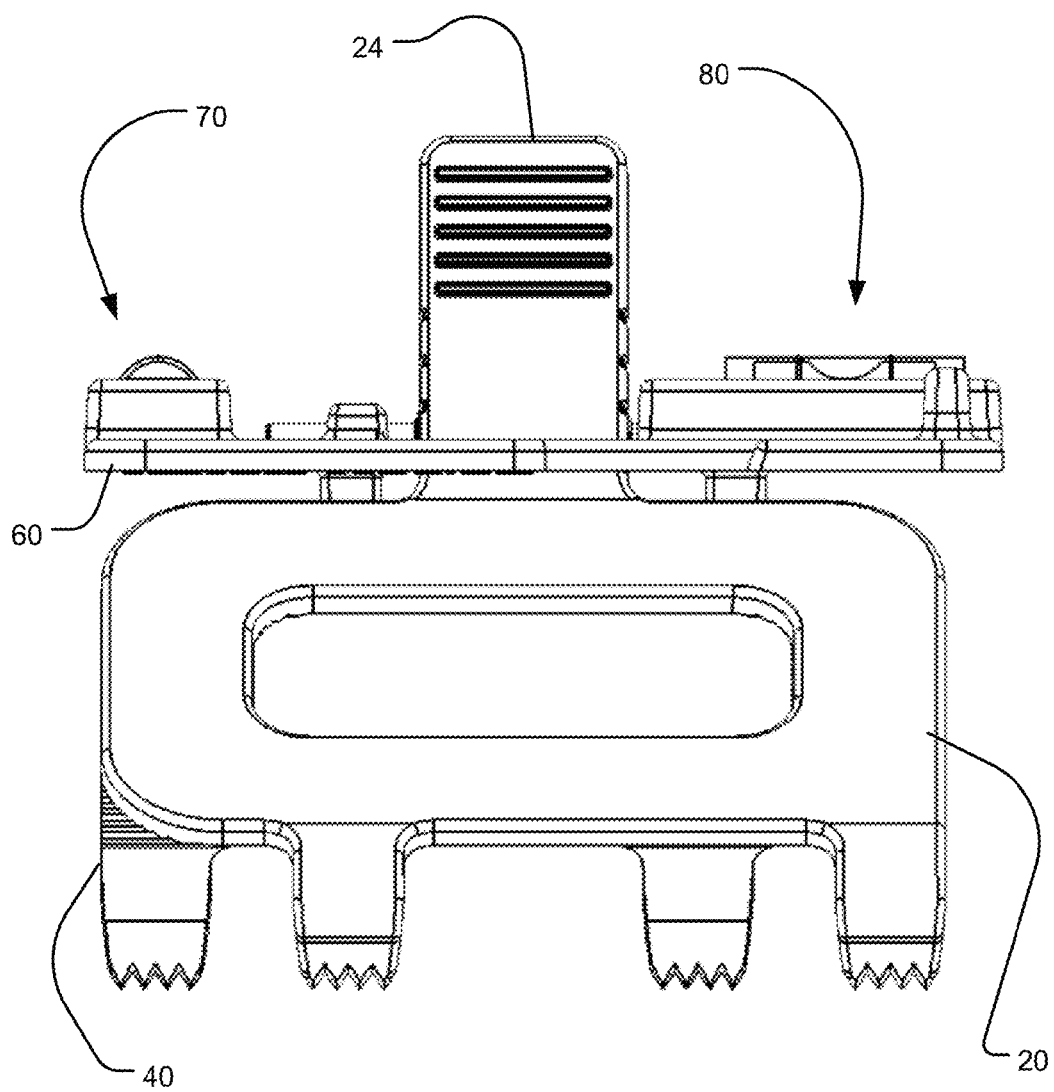
FIG. 2 illustrates a left side elevation view of an exemplary embodiment of a clamping indicator tool.

FIG. 2 illustrates a left side elevation view of an exemplary embodiment of a clamping indicator tool 10. From this angle, it is easy to see the tool plate 60 engaged atop the clamping arms 20 and 40 with the first grasp handle 24 protruding through the top of the tool plate 60.

Figure 3:
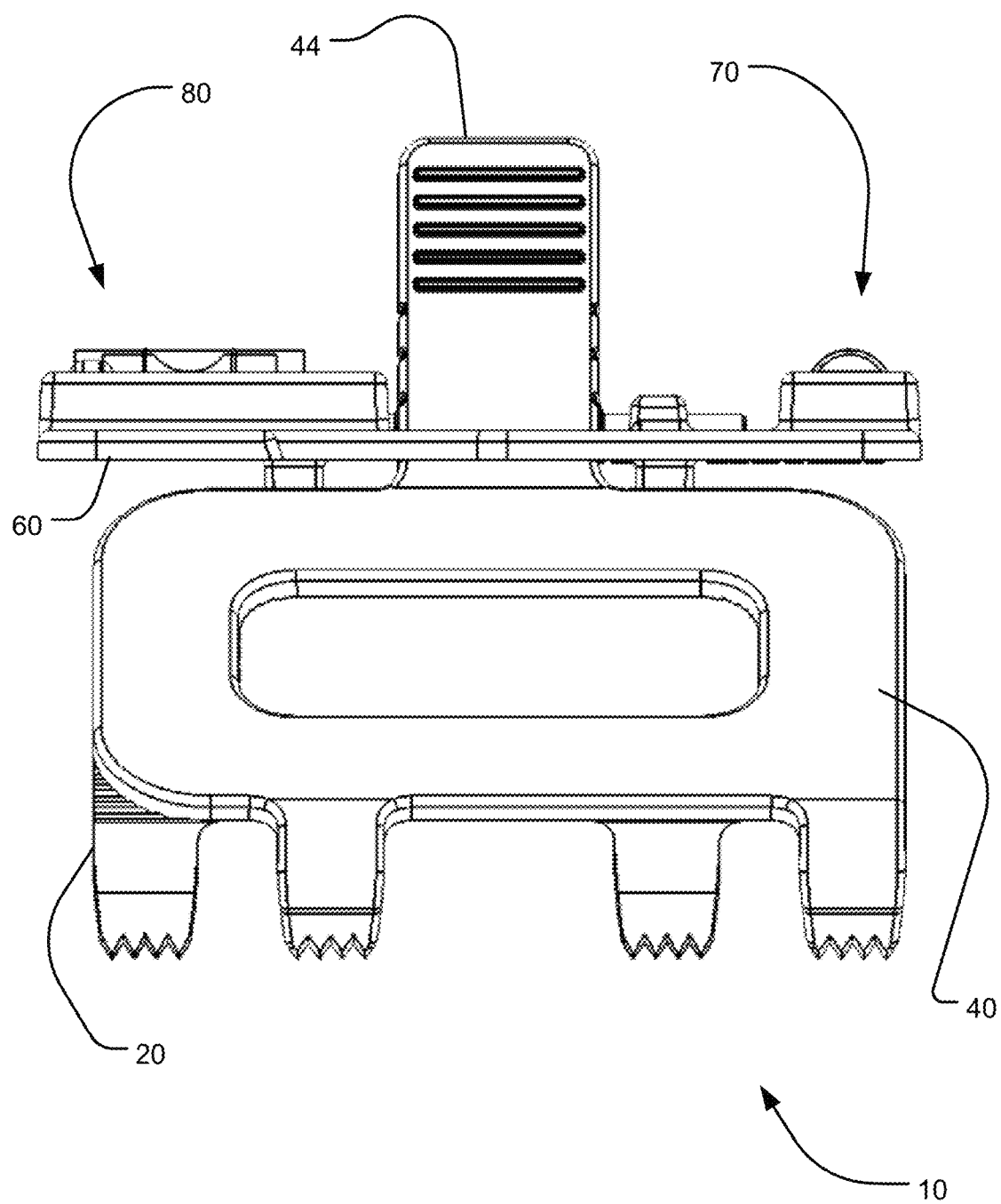
FIG. 3 illustrates a right side elevation view of an exemplary embodiment of a clamping indicator tool.

FIG. 3 illustrates a right side elevation view of an exemplary embodiment of a clamping indicator tool 10. In this view, the other clamping arm 40 is mainly visible as is the second grasp handle 44 protruding through the top of the tool plate 60.

Figure 4:
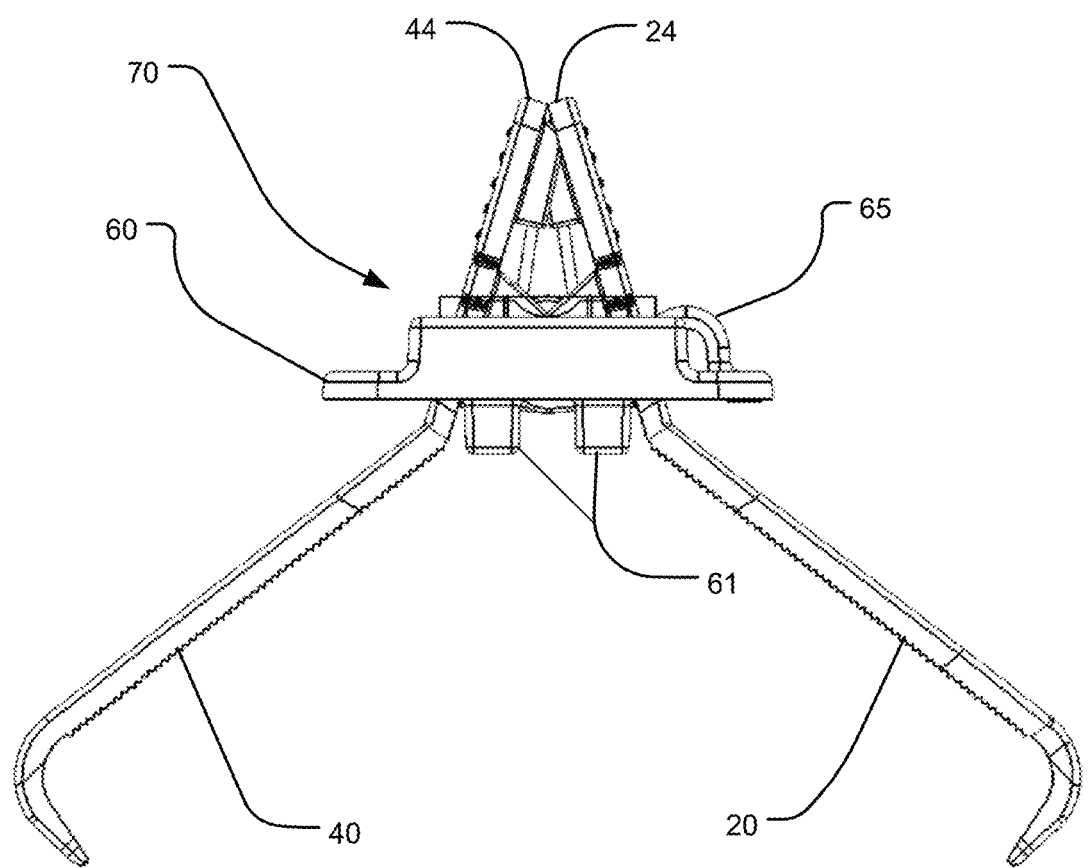
FIG. 4 illustrates a rear side elevation view of an exemplary embodiment of a clamping indicator tool.

FIG. 4 illustrates a rear side elevation view of an exemplary embodiment of a clamping indicator tool 10. In this view, it is apparent that when the user squeezes the first and second grasp handles 24 and 44 together, it causes the attached first and second clamping arms 20 and 40 to spread apart, as shown in FIG. 4. Compare this to FIG. 11 wherein the grasp handles are allowed to separate via an internal spring action (or other mechanism) and the first and second clamping arms 20 and 40 are therefore brought and held together.

Figure 5:
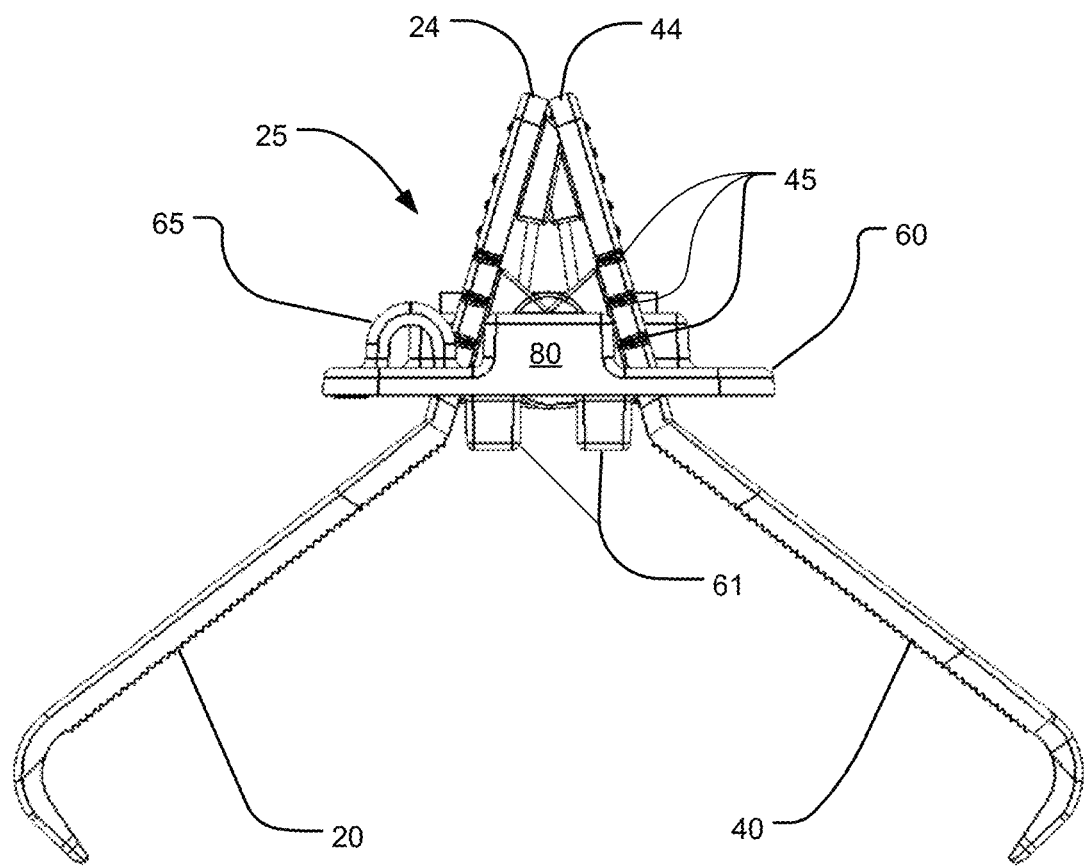
FIG. 5 illustrates a front side elevation view of an exemplary embodiment of a clamping indicator tool.

FIG. 5 illustrates a front side elevation view of an exemplary embodiment of a clamping indicator tool 10. Here the tie loop 65 is visible from the side and it becomes more apparent that a cord, or other length of material, can be inserted through the tie loop 65 and tied off.

Also highlighted in FIG. 5 is the plurality of alignment indicia 25 and 45. These indicia can be utilized by the user to ensure that the tool plate 60 is properly aligned with the clamping mechanism 15 before indicator readings are taken. This is accomplished simply by tilting the tool plate 60 left and right until the distances from the plate 60 to the nearest alignment indicia 25 and 45 are the same on both grasp handles 24 and 44.

FIG. 5 also introduces the cable locks 61. These are a plurality of sets of structures extending downwards under the tool plate 60. The two that make up each set are gapped from one another slightly more at the bottom than at the top, where the "tops" of the cable locks 61 are attached to the bottom of the tool plate 60 and the "bottoms" of the cable locks 61 extend downwards therefrom. Because the distance between the cable locks 61 decreases as you approach the tool plate 60, any cable (such as coaxial cable, Ethernet cable, etc.) that is pressed therebetween will be compressed and held by the cable locks 61. The distance between the locks can be customized to increase the ability for the locks 61 to properly grasp any size cable, wire, pipe, etc. as desired by the user. This allows the tool 10 to be used on such items without employing the clamping mechanism 15.

Figure 6:
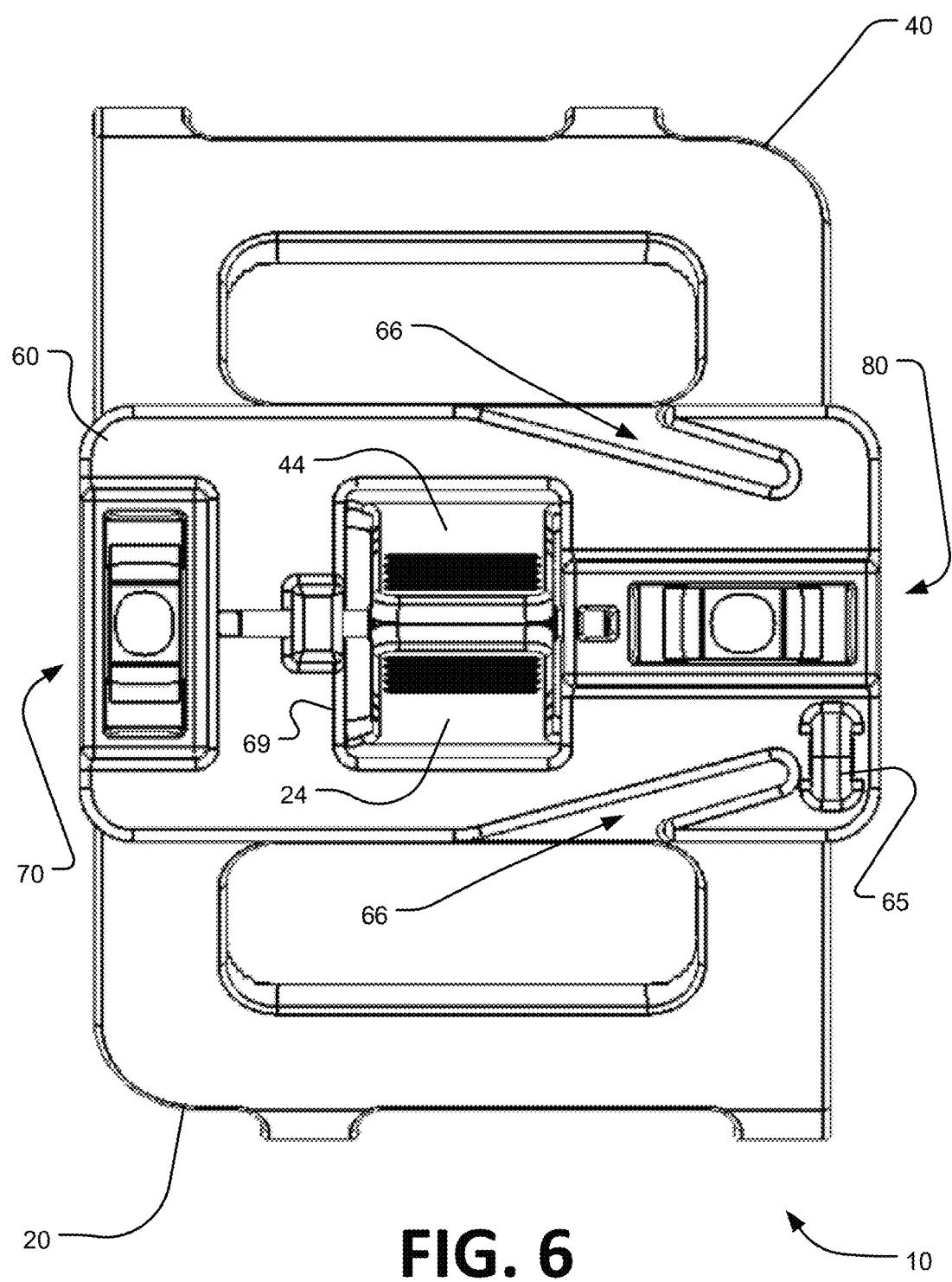
FIG. 6 illustrates a top plan view of an exemplary embodiment of a clamping indicator tool.

FIG. 6 illustrates a top plan view of an exemplary embodiment of a clamping indicator tool 10. This FIG. shows the tool 10 with the clamping mechanism 15 fully opened and awaiting clamping. Note how the top of the grasp handles 24 and 44 are touching indicating that they can not be pressed together any further, and hence, the clamping arms 20 and 40 can not be spread apart any further as well.

Figure 7:
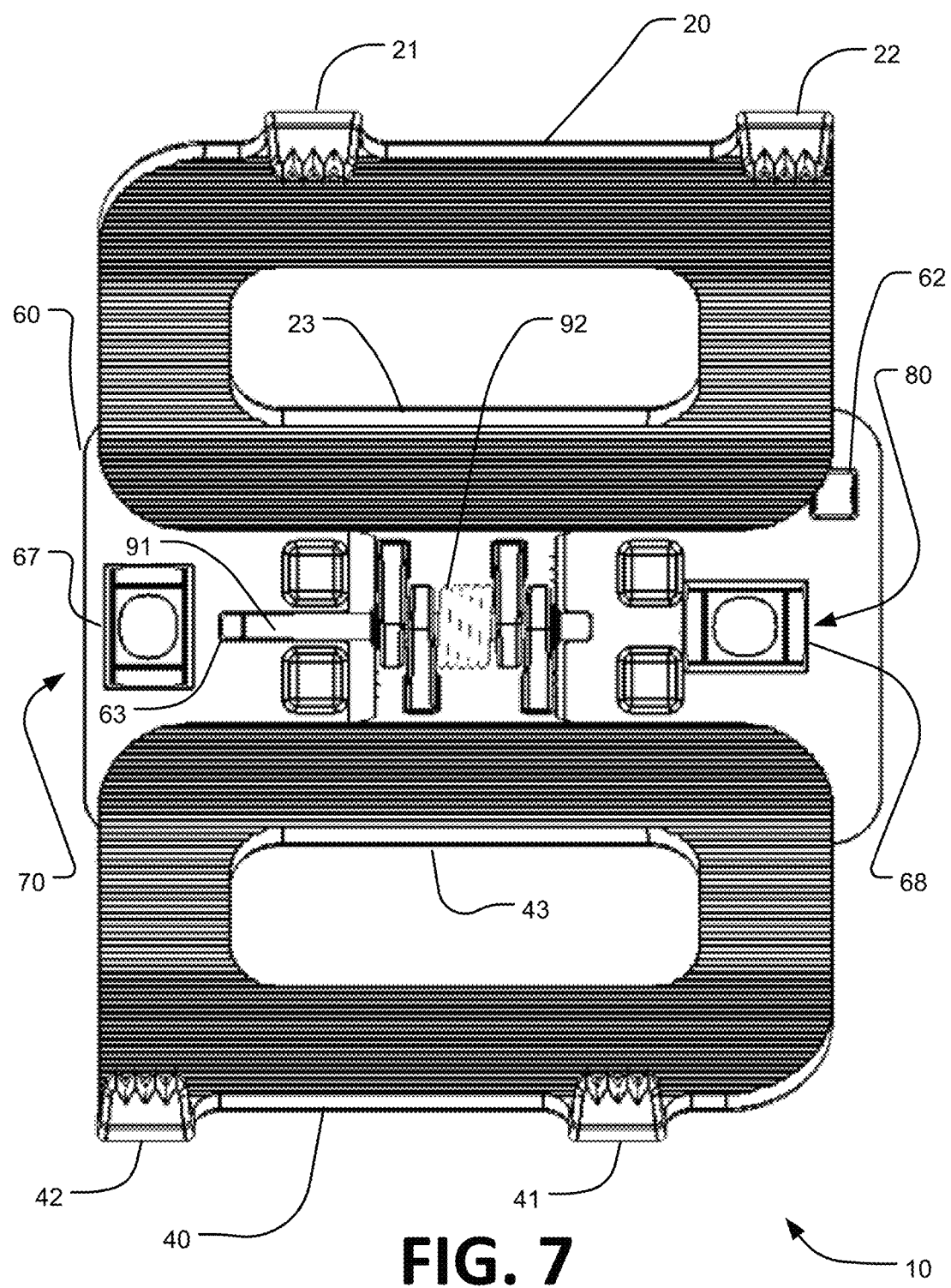
FIG. 7 illustrates a bottom plan view of an exemplary embodiment of a clamping indicator tool.

FIG. 7 illustrates a bottom plan view of an exemplary embodiment of a clamping indicator tool 10. In this view, a number of components not previously illustrated are shown. The first clamping arm 20 is illustrated with a plurality of clamping paws 21 and 22. These paws 21 and 22 extend from the distal end of the clamping arm 20 and can be bent inwards at an angle thereto so as to better grab any item on which the user wishes to clamp the tool 10. Similarly, the second clamping arm 40 can have a plurality of clamping paws 41 and 42. Note that they can be offset with regards to the clamping paws 21 and 22 of the first clamping arm 20. In another embodiment, the pluralities of clamping paws 21, 22, and 41, 42 are not offset from each other.

The tie port 62 is visible in FIG. 7 and it is apparent that it comprises a port through which a string, cable, wire, etc. can be passed in order to suspend the tool 10 therefrom (or for whatever other reason the user may have). Note the spring 92 is visible in the center of the tool 10. The spring 92 (or other tensioning device) provides the force that forces the clamping arms 20 and 40 together and lets them grasp any item that is placed therebetween. The spring acts to force apart the grasp handles 24 and 44 until the user forces them together. Since the clamping arms 20 and 40 are attached to the grasp handles 24 and 44, when the user forces the handles together, he or she causes the clamping arms 20 and 40 to separate and open. Once the user releases the grasp handles 24 and 44, the spring 92 forces the grasp handles apart and closes the clamping arms 20 and 40 onto the item to be clamped.

A tie rod 91 fits within a tie rod trough 63 on the underside of the tool plate in the embodiment illustrated in FIG. 7. The tie rod 91 can be pushed through the grasp handles, through the spring, and back into the tool plate 60. The tie rod 91 can then be pressed into the trough 63 and effectively 'locked' in place so as to hold the clamping mechanism 15 in position relative to the tool plate 60. Since the tie rod can be round (cylindrical), the tool plate can rotate or tilt on the tie rod relative to the clamping mechanism 15.

A first view port 67 and a second view port 68 are visible in FIG. 7. These view ports allow the user to view the level and plumb indicators from underneath the tool plate 60 when a reading from above is difficult or impossible to perform.

Figure 8:
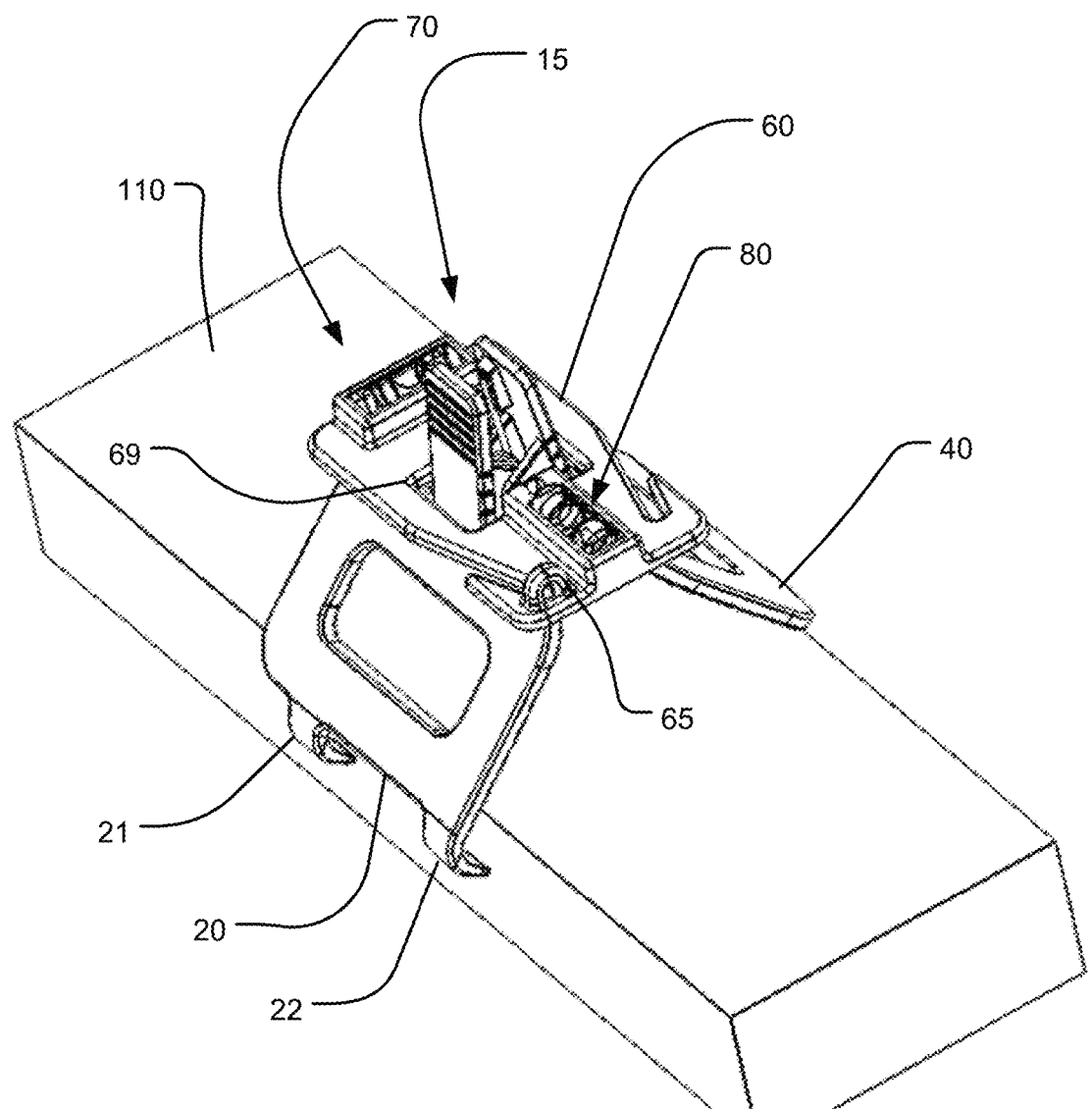
FIG. 8 illustrates a top and front perspective view of an exemplary embodiment of a clamping indicator tool clamped in place on a board.

FIG. 8 illustrates a top and front perspective view of an exemplary embodiment of a clamping indicator tool 10 clamped in place on a clamped item 110, in this example, the clamped item 110 is a board. Note how the plurality of clamping paws 21 and 22 (and their counterparts 41 and 42 on the opposing clamping arm 40) engage the board and hold the tool 10 firmly in place. With other clamped items 110, the clamping arms might engage the item rather than the clamping paws.

Figure 9:
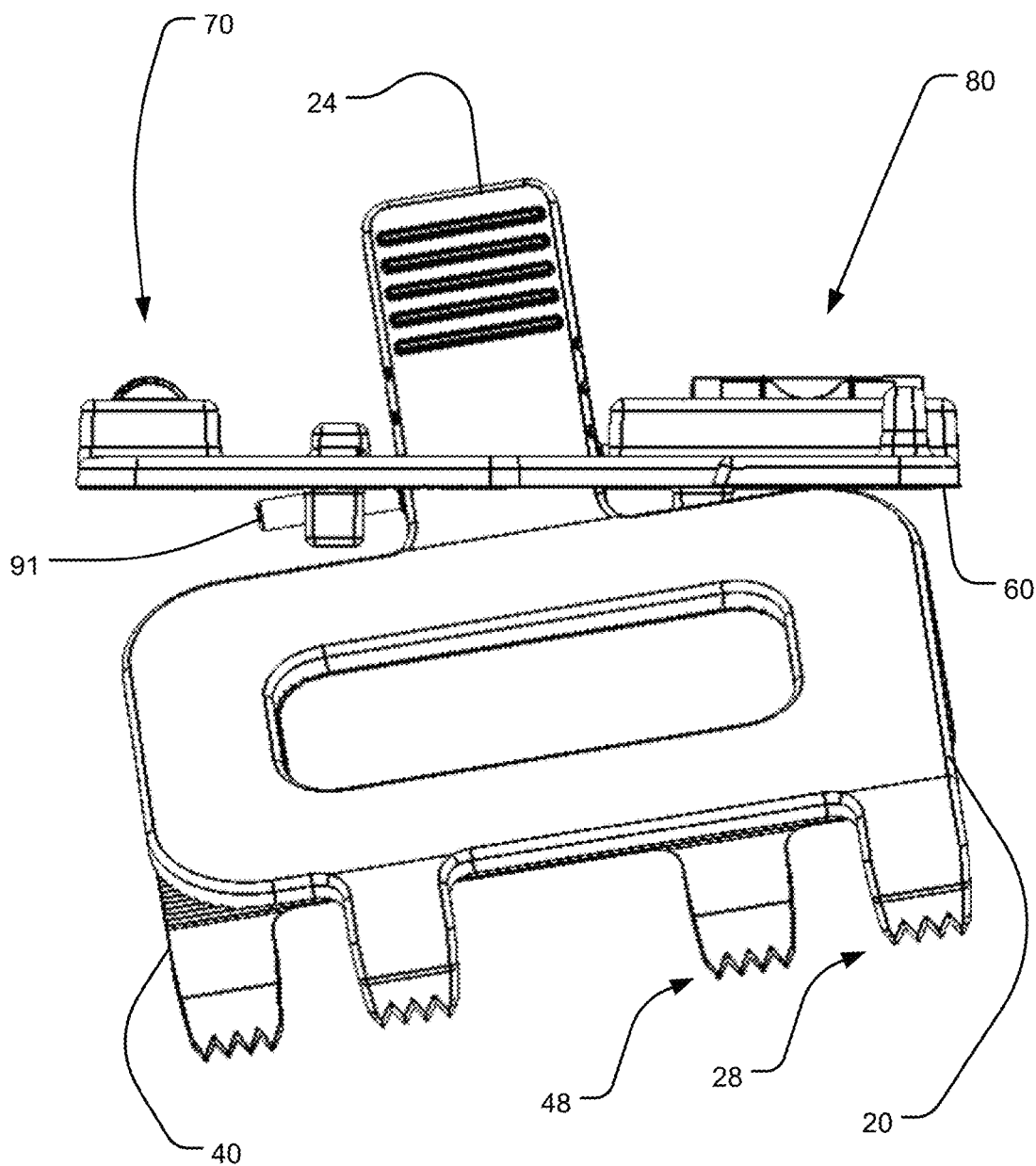
FIG. 9 illustrates a left side elevation view of an exemplary embodiment of a clamping indicator tool displaying a tilting feature.

FIG. 9 illustrates a left side elevation view of an exemplary embodiment of a clamping indicator tool 10 displaying another tilting feature. As described above, if a round tie rod 91 is used, then the tool plate 60 can rotate or tilt on the tie rod from side to side. Additionally, since one end of the tie rod 91 can optionally be made removable, the entire tool plate 60 can also be made to tilt front to back as shown in FIG. 9.

Figure 10:
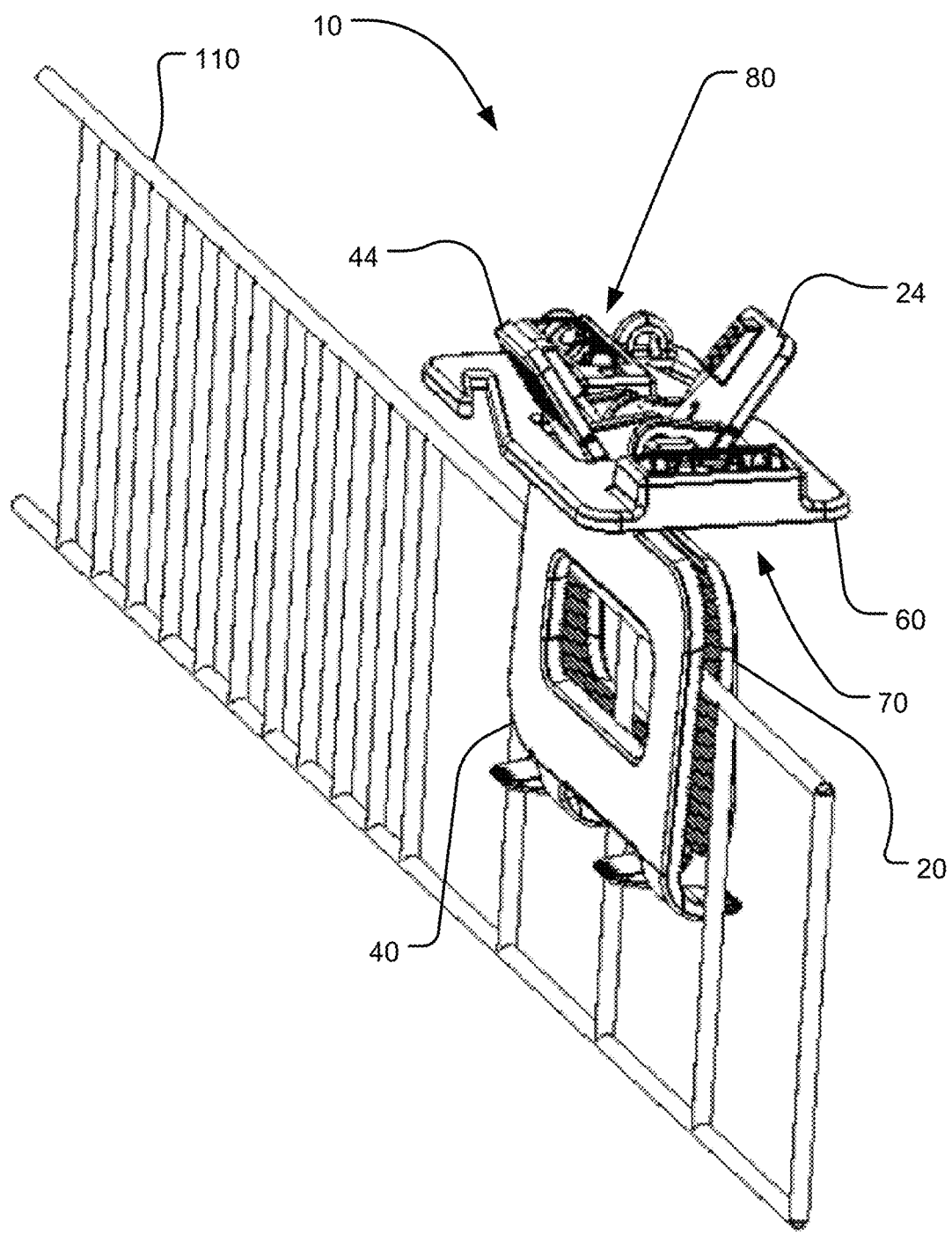
FIG. 10 illustrates a top and rear perspective view of an exemplary embodiment of a clamping indicator tool clamped in place on a thin wire rack.

FIG. 10 illustrates a top and rear perspective view of an exemplary embodiment of a clamping indicator tool 10 clamped in place on a clamped item 110 comprising a thin wire rack in this illustration. Note how versatile the clamping mechanism 15 is to allow very thin clamped items such as shown here to be clamped as well as very thick items such as the board shown in FIG. 8.

Figure 11:
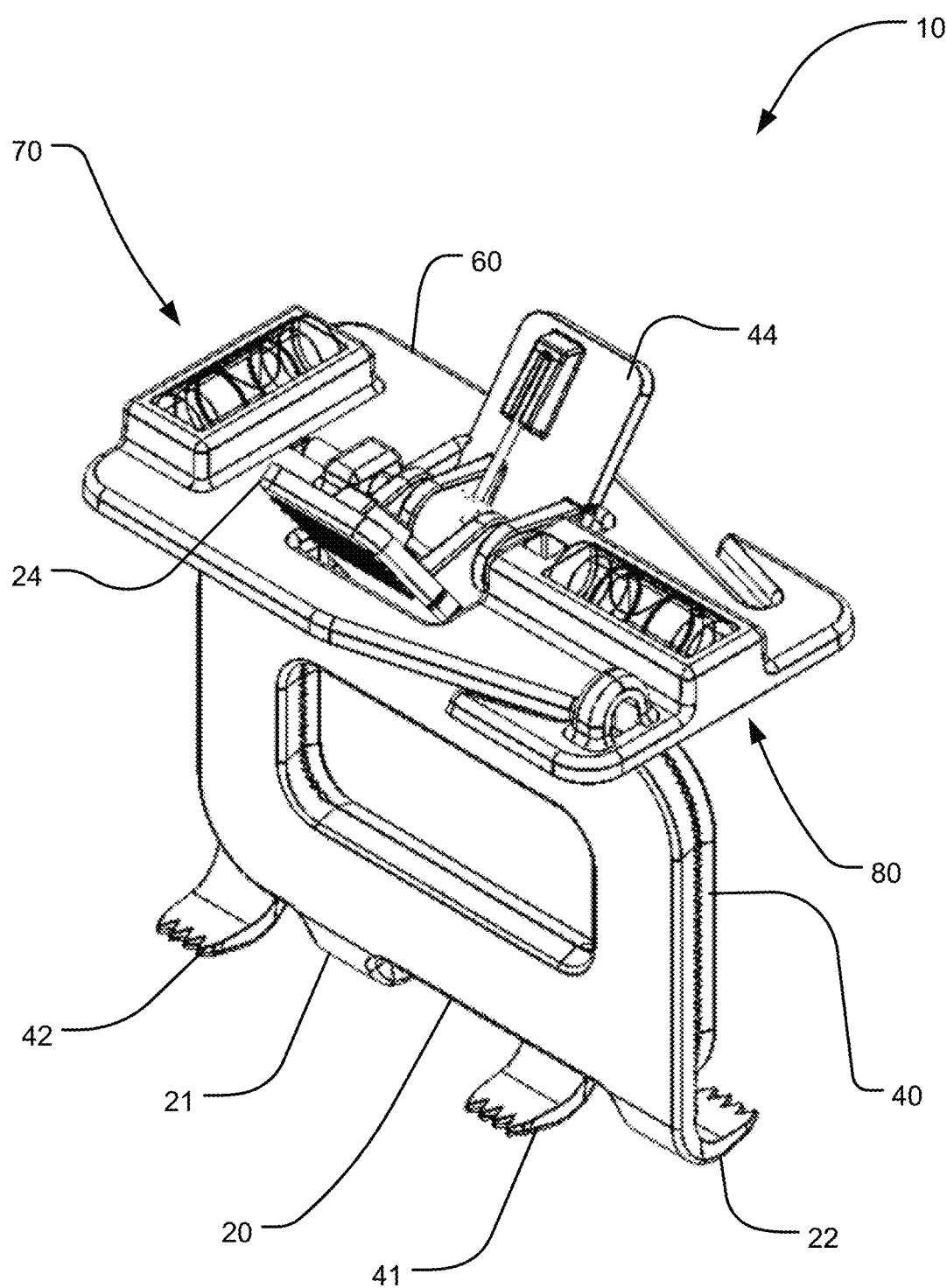
FIG. 11 illustrates a top and front perspective view of an exemplary embodiment of a clamping indicator tool with the clamp closed.

FIG. 11 illustrates a top and front perspective view of an exemplary embodiment of a clamping indicator tool 10 with the clamp closed. Note that when the clamping mechanism 15 is closed, the clamping arms 20 and 40 can mostly abut one another, thereby providing enhanced surface area when clamping small items. In this embodiment, the sets of clamping paws 21 and 42, and 22 and 41 are offset from each other so that they slide past each other when the clamping mechanism 15 is fully closed (rather than engaging each other and not allowing the inner surfaces of the clamping arms 20 and 40 to touch).

Figure 12:
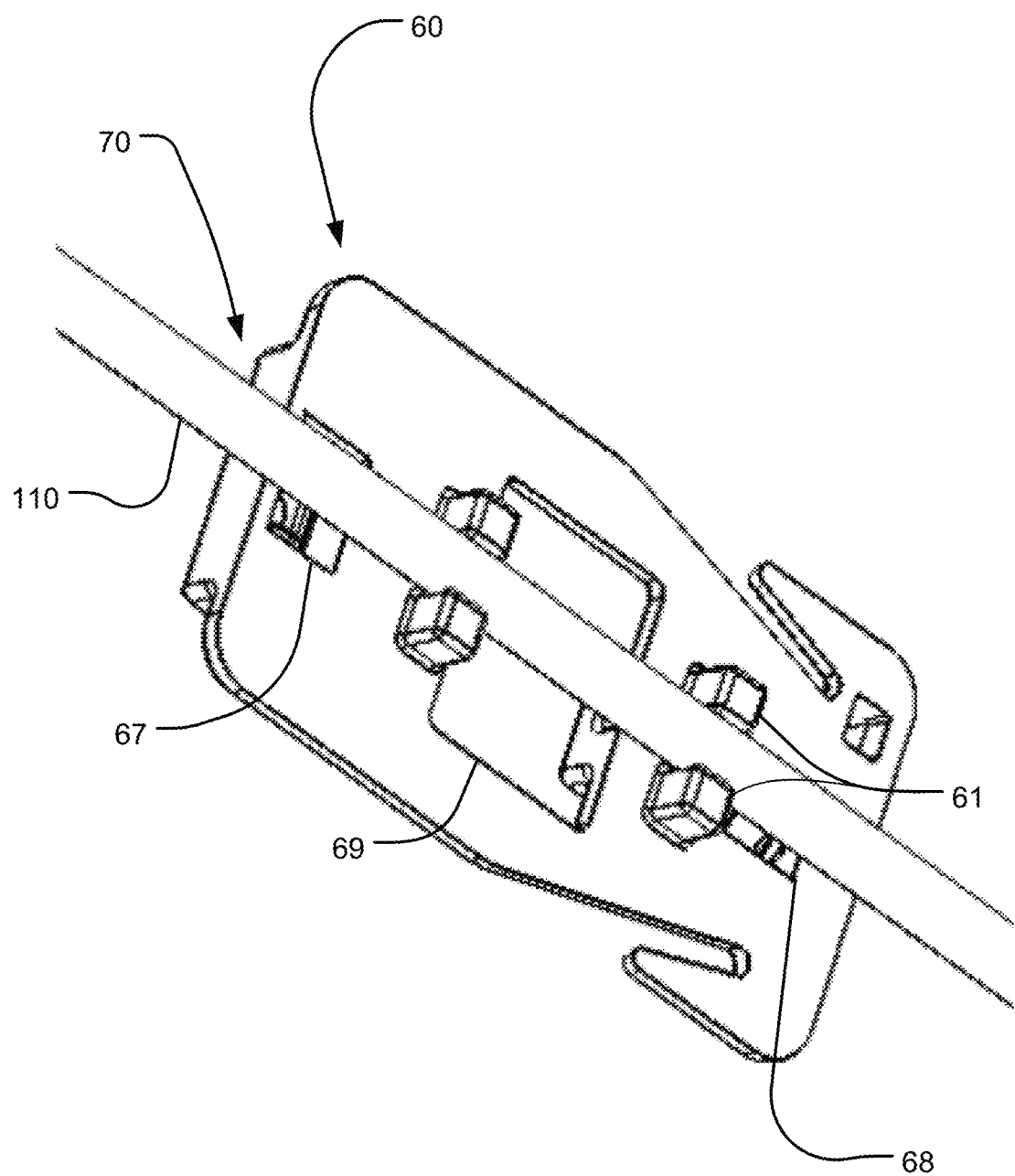
FIG. 12 illustrates a bottom and front perspective view of an exemplary embodiment of a tool plate of a clamping indicator tool with the clamp removed and the tool plate affixed to a cable using a plurality of cable locks.

FIG. 12 illustrates a bottom and front perspective view of an exemplary embodiment of a tool plate 60 of a clamping indicator tool with the clamping mechanism 15 removed and the tool plate 60 affixed to a cable 110 using a plurality of cable locks 61. In this FIG., the clamped item 110 is a coaxial cable and it should be clear that the cable locks 61 are designed with the proper spacing therebetween to fully engage and hold the cable when the tool plate 60 is pressed onto the cable. This allows the tool 10 to be used without the clamping mechanism 15. In this embodiment, the clamping mechanism 15 is easily removed by simply popping out one end of the tie rod 91 from the tie rod trough 63 and then pulling the tie rod 91 from the grasp handles 24 and 44 and dropping the grasp handles through the clamping handle port 69.

Figure 13:
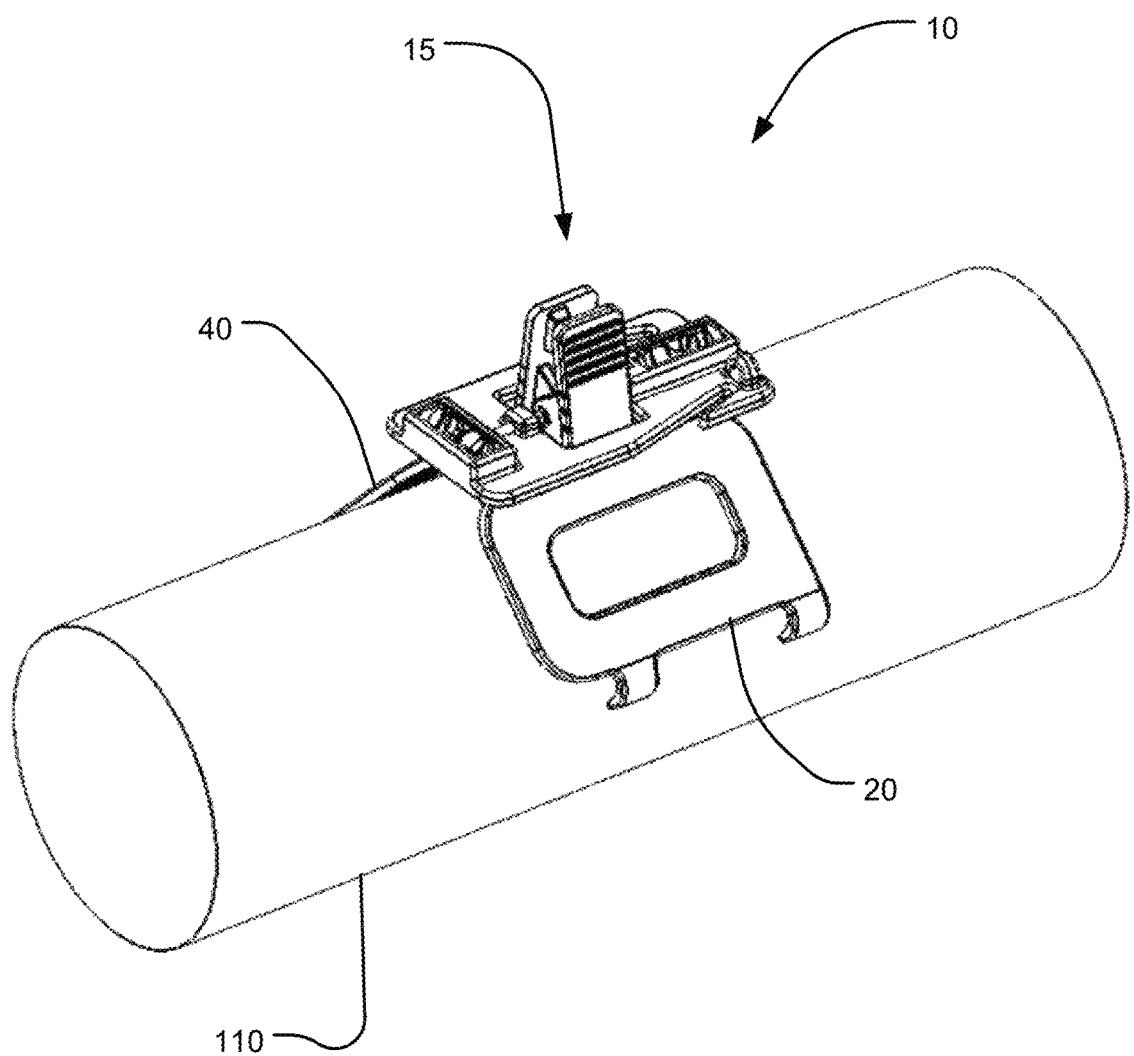
FIG. 13 illustrates a top and rear perspective view of an exemplary embodiment of a clamping indicator tool clamped in place on a piece of round pipe.

FIG. 13 illustrates a top and rear perspective view of an exemplary embodiment of a clamping indicator tool 10 clamped in place on a piece of round pipe 110. Note how the clamping arms 20 and 40 engage the pipe and the alignment grooves thereon (see FIGS. 14 and 15 for more detail) align the tool with the clamped item 110.

Figure 14:
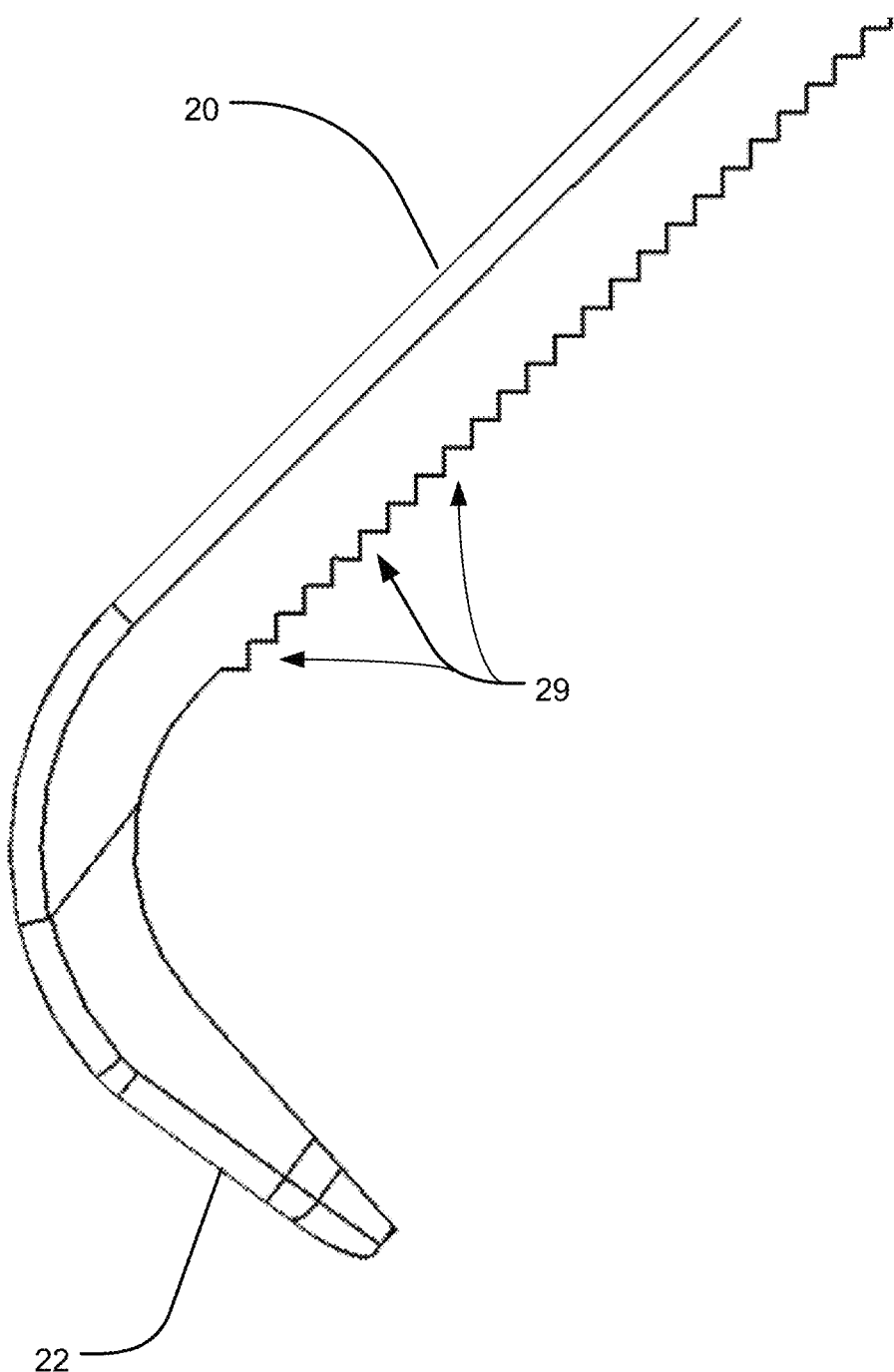
FIG. 14 illustrates a side elevation view of an exemplary embodiment of a clamping arm and a clamping paw of a clamping indicator tool shown in close-up detail from the side.

FIG. 14 illustrates a side elevation view of an exemplary embodiment of a clamping arm 20 and a clamping paw 22 of a clamping indicator tool shown in close-up detail from the side. Note that a plurality of alignment grooves 29 have been incorporated into the inner surface of the clamping arm 20. These grooves run perpendicular to the clamping arm as it extends outwards/downwards from the tool plate 60. This allows the tool 10 to naturally align with the clamped item 110 as the clamping arms 20 and 40 close about the clamped item 110.

Figure 15:
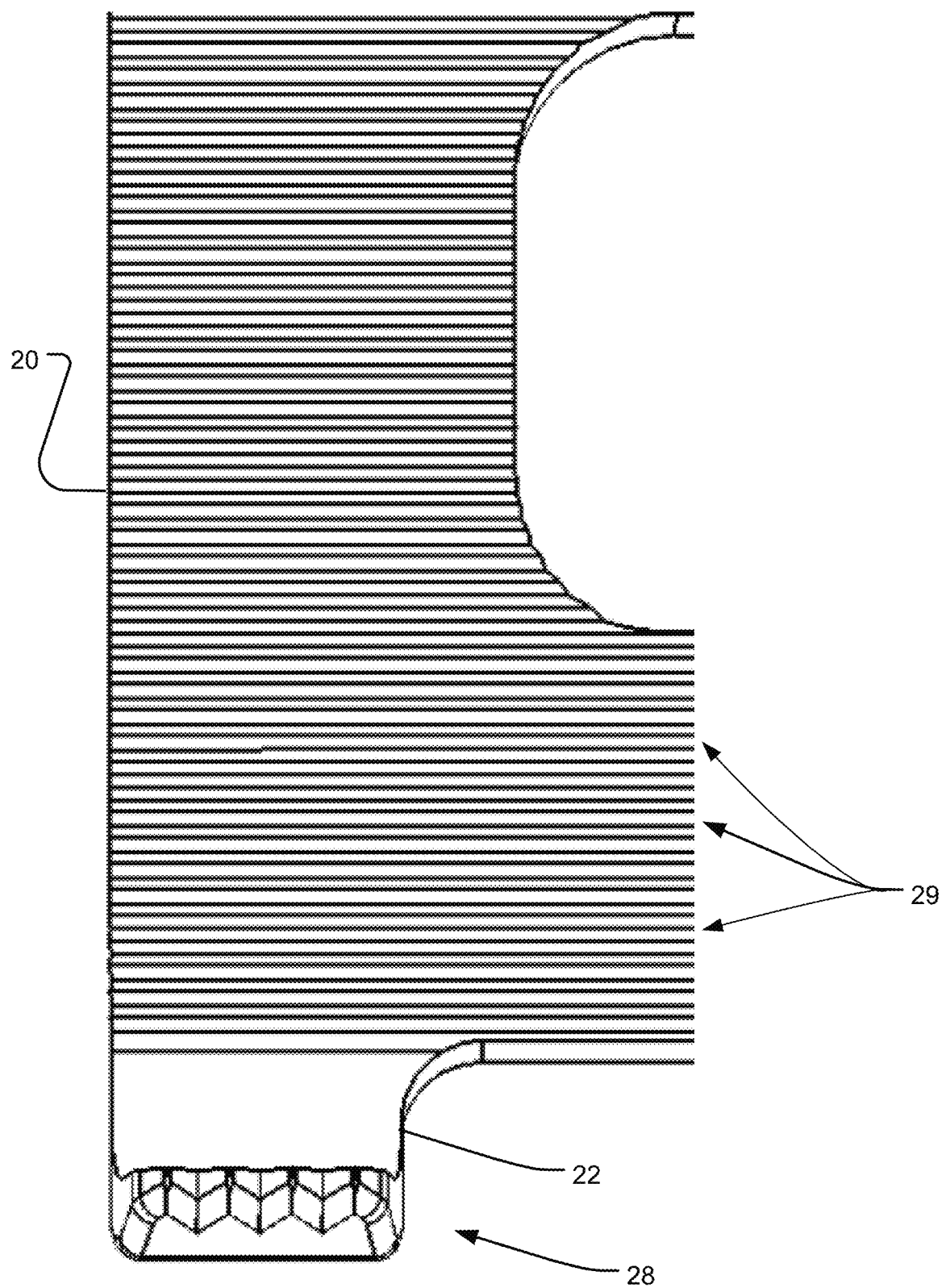
FIG. 15 illustrates a side elevation view of an exemplary embodiment of a clamping arm and a clamping paw of a clamping indicator tool shown in close-up detail from the bottom.

FIG. 15 illustrates a side elevation view of an exemplary embodiment of a clamping arm 20 and a clamping paw 22 of a clamping indicator tool shown in close-up detail from the bottom in order to illustrate the plurality of alignment grooves 29 face-on. The grooves can be small parallel grooves, or they can be wider grooves to engage larger items. Further, the grooves can be cupped to better engage pipes or other cylindrical items as needed.

Figure 16:
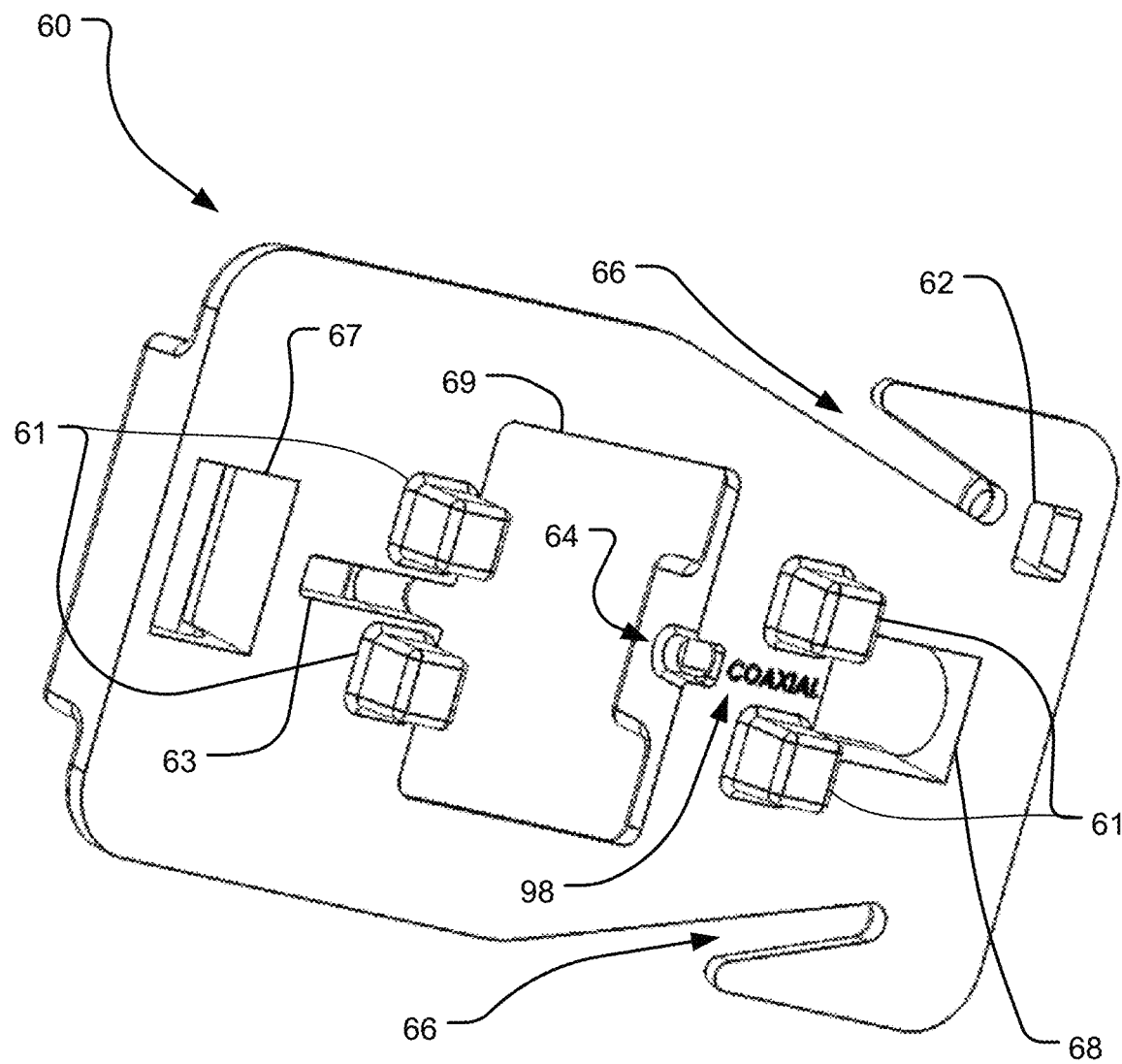
FIG. 16 illustrates a bottom and rear perspective view of an exemplary embodiment of a tool plate of a clamping indicator tool with the clamp removed.

FIG. 16 illustrates a bottom and rear perspective view of an exemplary embodiment of a tool plate of a clamping indicator tool with the clamping mechanism 15 removed. In this view, a type indicia 98 is illustrated showing the type of cable that these particular cable locks 61 are designed to fit. Note also that the tie rod receiver port 64 is visible. This port receives therein the distal end of the tie rod 91 after it has passed through the spring and simultaneously engaged the grasp handles so that they hinge on the tie rod 91. The proximal end of the tie rod 91 can then be pressed down into the tie rod trough 63 and locked therein, effectively holding the clamping mechanism 15 within the tool plate 60.

Figure 17:
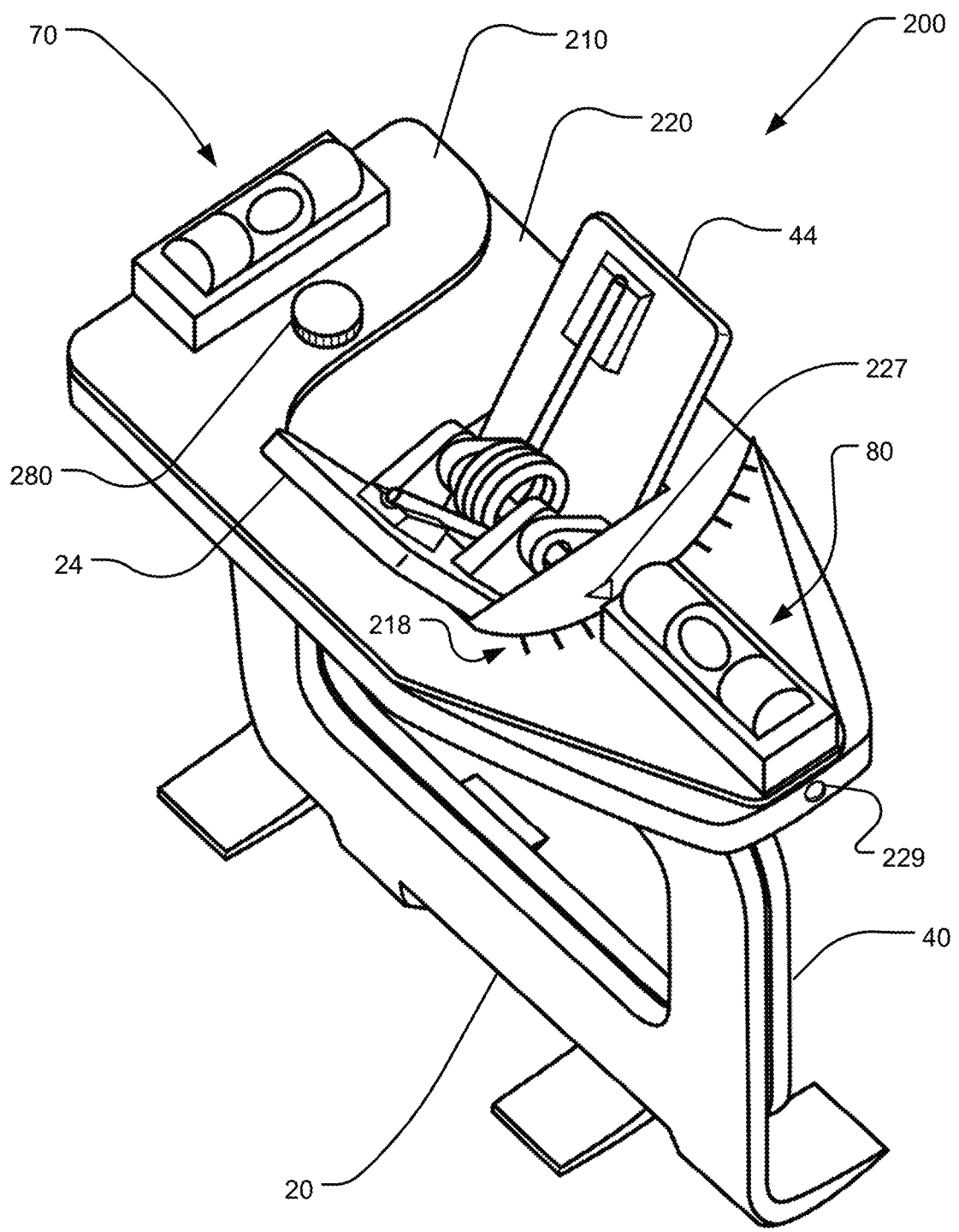
FIG. 17 illustrates a top and front perspective view of another exemplary embodiment of a clamping indicator tool utilizing a slope plate.

FIG. 17 illustrates a top and front perspective view of another exemplary embodiment of a clamping indicator tool utilizing a slope plate 200. This embodiment of a slope plate 200 utilizes a bottom plate 220 and a top plate 210. The bottom plate 220 engages the clamping mechanism 15 as above, or, in another embodiment, a simple push rod 229 is inserted in the bottom plate 220 and engages the clamping mechanism 15 similar to the way the tie road 91 engaged it above. In FIG. 17, the bottom plate 220 has an indicator mark 227 which indicates the slope displayed on the top plate 210. The top plate 210 contains a bubble level and a bubble plumb that can be used with the slope indicator to determine the slope at which the clamped item is leaning. Similarly, once the slope indicator is clamped to the clamped item, the entire apparatus can be adjusted until the clamping indicator tool 10 displays the desired slope.

The top plate has a slope indicator indicia 218 that works with the indicator mark 227 to indicate the slope. The two plates are hingedly attached to one another by the thumb screw 280 which can be loosened or tightened to allow the plates to swing or be locked tightly together.

Figure 18:
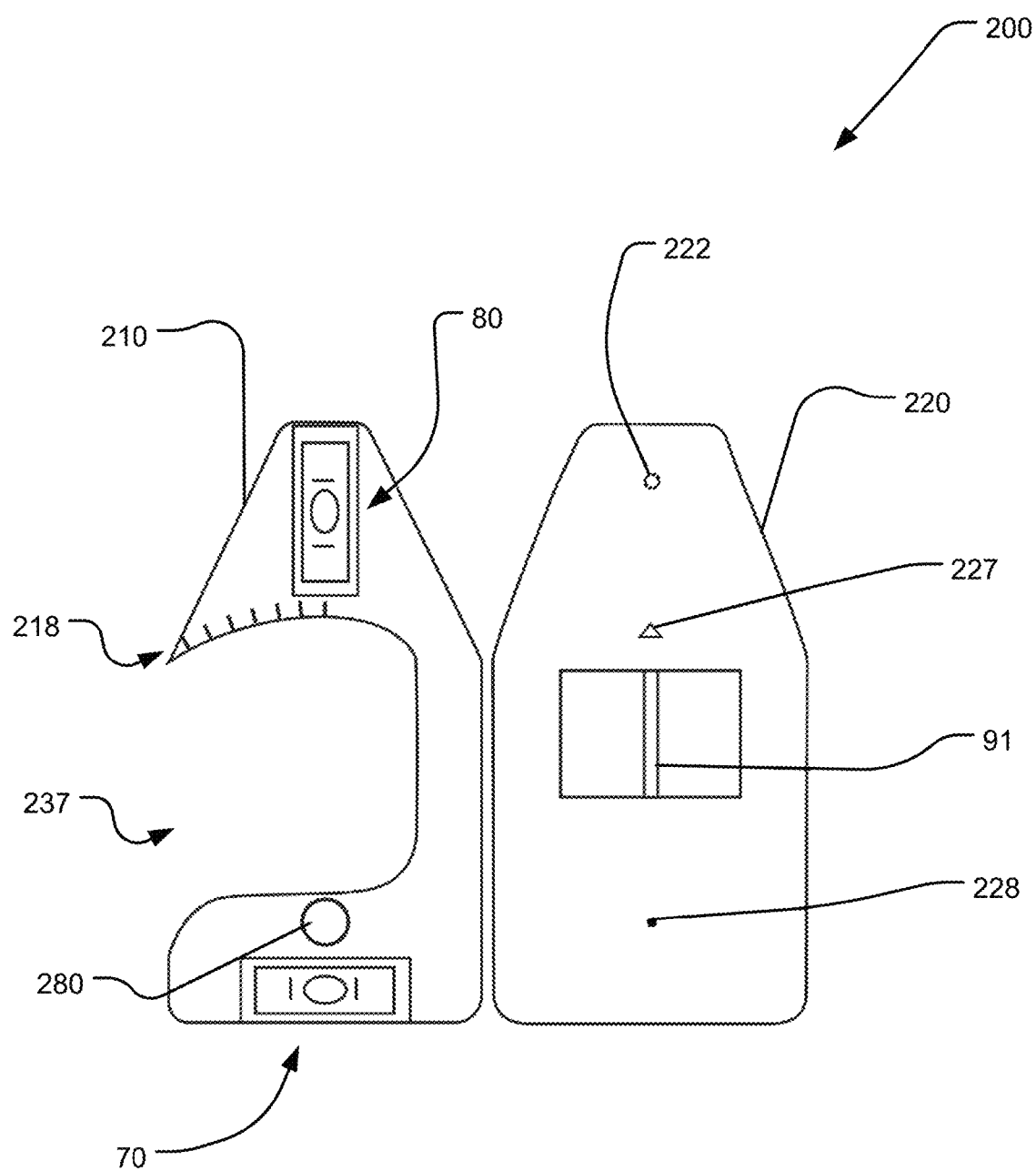
FIG. 18 illustrates a top plan view of two components of a slope plate.

FIG. 18 illustrates a top plan view of two components of a slope plate 200. Here the top plate 210 is shown separately from the bottom plate 220. The thumb screw mount hole 228 is visible in the bottom plate 220 as is a bearing bump 222 that helps the user properly align the two plates back together (a corresponding bearing bump crater can be placed under the top plate to receive and engage the bear bump 222). Note that the cut away 237 in the top plate allows for clearance of all parts on the bottom plate and the clamping mechanism so that the top plate can hingeably swing on the thumb screw freely without contacting any of those parts.

Figure 19:
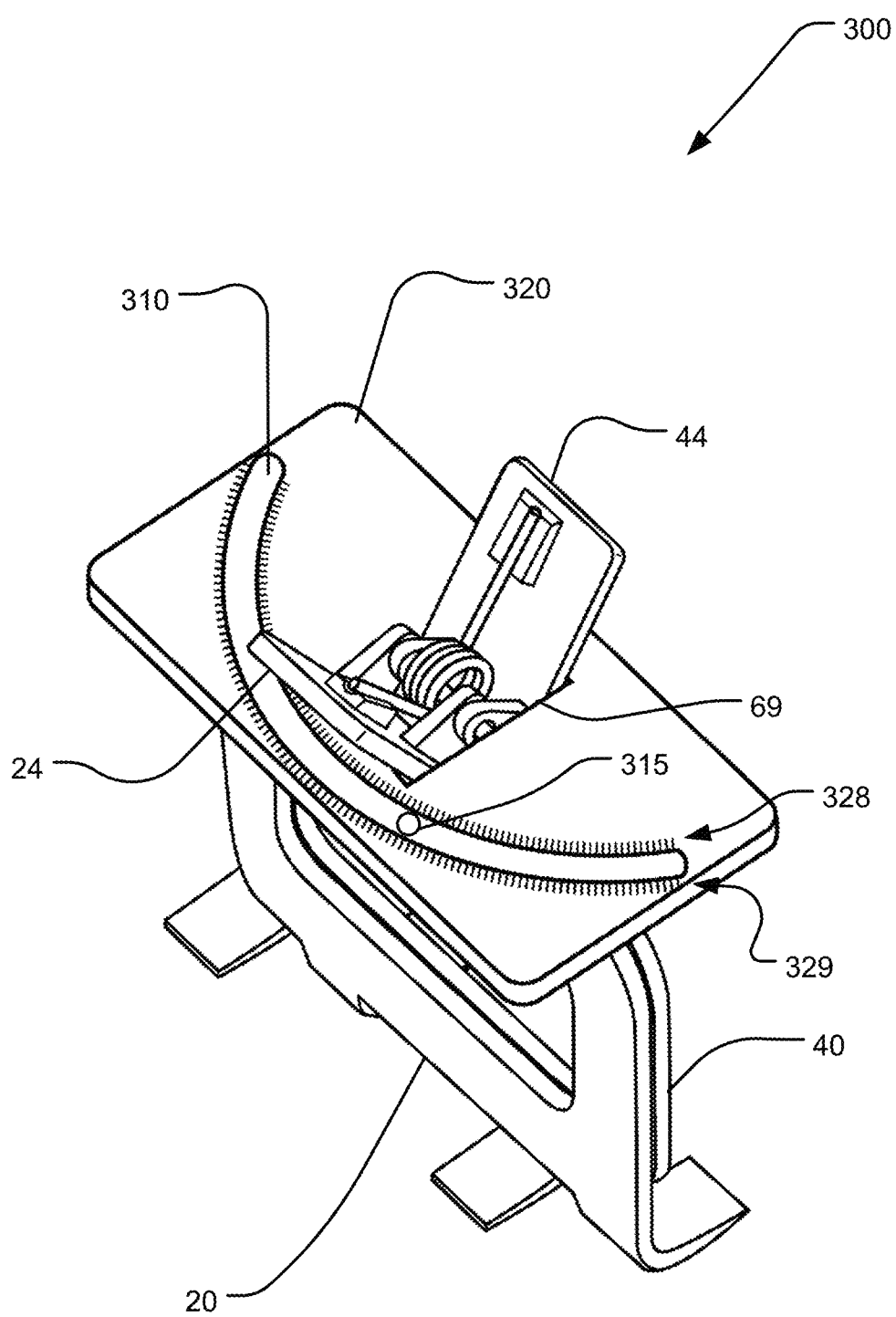
FIG. 19 illustrates a top and front perspective view of yet another exemplary embodiment of a clamping indicator tool utilizing an alternate slope plate.

FIG. 19 illustrates a top and front perspective view of yet another exemplary embodiment of a clamping indicator tool utilizing an alternate slope plate 300. In this embodiment, a single component slope plate 300 is used. Here, a round ball bearing 315 (or similar) is allowed to freely roll within an indicator channel 310. As the slope changes, the ball 315 finds the lowest location and the slope indicia 328 and 329 can be read to determine the slope. The main body plate 320 is just a single plate versus the top and bottom plates of the earlier embodiment detailed above.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventor may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventor contemplates the various aspects in any number of claim forms. Accordingly, the inventor reserves the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

What is claimed is:

1. A clamping indicator tool, comprising:
    a clamping mechanism and a tool plate;
    the clamping mechanism comprising a first clamp and a second clamp;
    the first clamp has a first grasp handle attached to a first clamping arm;
    the second clamp has a second grasp handle attached to a second clamping arm;
    the tool plate has a clamping handle port therein that is adapted to allow the grasp handles to fit therethrough;
    a tie rod adapted to hingeably connect the clamping mechanism and the tool plate;
    the first and second clamping arms extending downwards from the tool plate when in an unclamped configuration and adapted such that when a user squeezes the first and second grasp handles together the first and second clamping arms are forced apart;
    a spring adapted to draw the first and second clamping arms together when the user releases the first and second grasp handles; and
    a level indicator and a plumb indicator attached to a top of the tool plate and adapted to indicate the levelness and plumbness of an item clamped in the clamping mechanism.

2. The clamping indicator tool of claim 1 further comprising a plurality of hangers, a tie loop, and a tie port.

3. The clamping indicator tool of claim 1 further comprising a first plurality of clamping paws attached at a distal end of the first clamping arm and a second plurality of clamping paws attached at a distal end of the second clamping arm and adapted to assist the clamping mechanism in holding onto an item being clamped therein.

4. A slope indicator clamping tool having a slope plate and a clamping mechanism.

* * * * *